July 5, 1966  C. E. ROTHERT  3,259,414

METER RING LOCKING DEVICE

Filed July 29, 1964

INVENTOR.
CHARLES E. ROTHERT
BY Lyon & Lyon
ATTORNEYS

United States Patent Office 3,259,414
Patented July 5, 1966

3,259,414
METER RING LOCKING DEVICE
Charles E. Rothert, 1112 Pine St.,
Huntington Beach, Calif.
Filed July 29, 1964, Ser. No. 385,980
4 Claims. (Cl. 292—256.67)

This invention relates to a device for preventing the unauthorized opening and tampering with a meter of the type used to indicate the amount of electrical power used over a period of time by a consumer.

In electric meters generally in use today, the indicating mechanism and a disconnect circuit breaker are covered by a glass housing which is mounted on the base of the meter by means of an adjustable locking ring. The locking ring is split and has a support member mounted adjacent each end, the support mmebers being drawn together by means of a suitable bolt. In order to prevent tampering with the meter, a hole is formed in the leading end of the bolt and a second hole formed in the support member into which it extends and a wire passed through these holes. The ends of the wire are then joined by a lead seal.

In many cases where electrical service has been discontinued as a result of a failure to pay for the same, it has been found that this type of lead seal is not a sufficient deterrent to prevent entry into the meter and unauthorized reinstitution of electrical service. In such cases, it is necessary that the disconnection be made at a distribution point remote from the house. Such a disconnection consumes a large portion of a crew's day and thus is quite costly.

It is therefore an object of the present invention to provide a locking device for a meter which is reliable and extremely difficult to open.

It is also an object of the present invention to provide such a locking device which can be adapted for use with existing meter rings.

It is another object of the present invention to provide such a device in which a padlock or the like is used to prevent opening of the meter.

These and other objects and advantages of the present invention will become more apparent upon reference to the accompanying description and drawing in which.

Figure 1:
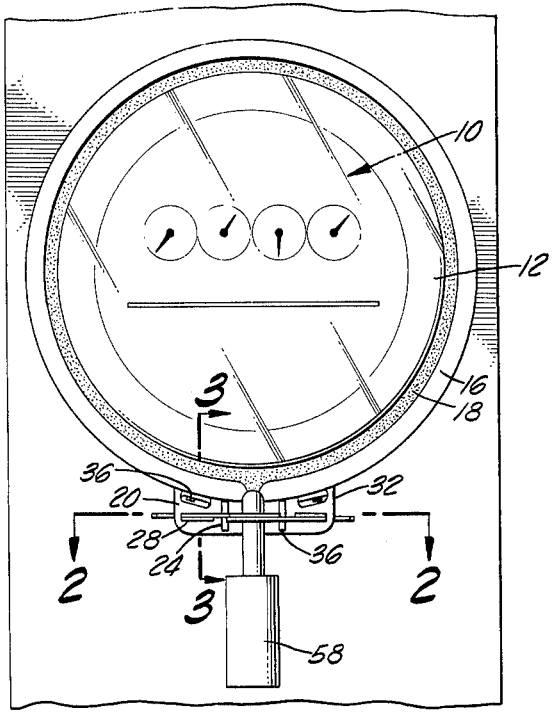
FIGURE 1 is an elevation view of the meter ring locking device of the present invention mounted on an electric meter.
Figure 2:
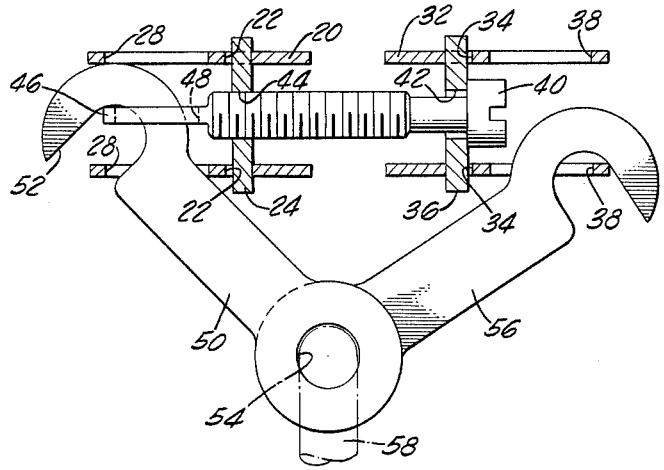
FIGURE 2 is a sectional view taken along lines 2—2 of FIGURE 1.
Figure 4:
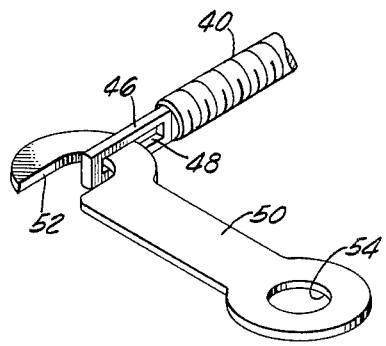
FIGURE 4 is a perspective view of part of the locking device of the present invention.
Figure 3:
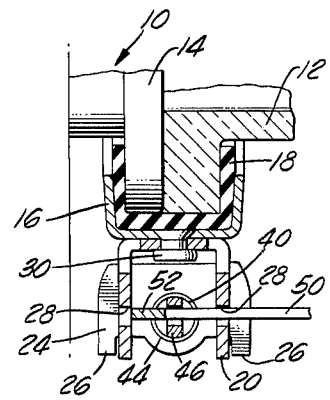
FIGURE 3 is a sectional view taken along lines 3—3 of FIGURE 1.

Referring now to the several figures, there is shown an electric meter 10 having a glass housing 12 mounted on the base 14 of the meter by means of a locking ring 16 having a generally U-shaped cross section. The locking ring is made of any suitable metal and is separated from the housing 12 and base 10 by a gasket made of a resilient material such as rubber.

Mounted on the outer periphery of one end of the split locking ring 16 is a support 20 having a base and a pair of upstanding side members. The base and side members of the support are provided with a vertical slot 22 in which is mounted a plate or nut 24 having a pair of ears 26 for preventing its removal from the slot. The support 20 is also provided with a pair of aligned horizontal slots 28. The base of the support 20 is fastened to the locking ring 16 in any suitable fashion, for example by a rivet 30.

A similar support 32 is riveted to the other end of the outer periphery of the ring 16, opposite the support 20. The support 32 is also provided with a slot 34 into which is inserted a plate or nut 36, and a pair of aligned horizontal slots 38. A bolt 40 is passed through the aperture 42 in the nut 36 and threaded into the threaded aperture 44 in the nut 24. The bolt 40 is provided with an elongated finger 46 having a solt 48 formed therein. The threaded aperture 44 is positioned in the nut 24 in such a manner that the slot 48 can be rotated into alignment with the slots 28 in the support 20.

A keeper 50 has a hooked portion 52 formed in one end thereof and is provided with an aperture 54 at its other end. When the locking ring has been tightened to the degree desired by turning the bolt 40, the hooked end 52 of the keeper 50 is passed through the slot 28 in the support 20 and through the slot 48 in the finger 46. A similar keeper 56 has its hooked end passed through one of the slots 38 in the support 32 and its aperture brought into alignment with the aperture 54 of the keeper 50. A padlock 58 can then be passed through these aligned apertures and locked top revent a loosening of the locking ring. Such loosening is prevented by the keepers acting to hold the two supports 20 and 32 together and by the keeper 50 preventing the bolt 40 from being rotated and removed.

From the foregoing description, it can be seen that a simple mechanism has been provided for securely locking a ring positioned about a meter to prevent unauthorized access thereto. Most existing locking rings can be adapted to include such a locking device to increase both the physical and psychological problems encountered by a would-be tamperer with the meter. While the invention has been described in connection with an electric meter, it should be obvious that it has equal utility for use in similar meters used by other public utilities.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device for locking meters of the type having a base and a flanged housing positioned over said base, comprising: a split ring for engaging both the meter base and the flange of the housing and preventing relative motion between them, a pair of supports mounted on the outer periphery of said ring adjacent the ends thereof, each of said supports including a plate having an aperture therein, said apertures being aligned and at least one of said apertures being threaded, each of said supports having a slot formed therein generally perpendicular to said plate, a threaded bolt passing through said apertures, said bolt having a slot formed in one end thereof, said bolt slot being aligned with the slot in one of said supports, a first keeper having one end passing through said aligned slots, a second keeper passing through the slot in the other support, the other ends of said keepers being adapted to receive a locking member.

2. A device for locking meters of the type having a base and a flanged housing positioned over said base, comprising: a split ring for engaging both the meter base and the flange of the housing and preventing relative motion between them, a pair of supports mounted on the outer periphery of said ring adjacent the ends thereof, each of said supports including a plate having an aperture therein, at least one of said apertures being threaded, said apertures being aligned for receiving a threaded member therethrough, each of said supports having a slot formed therein generally perpendicular to said plate, a member passing through said apertures, at least a portion of said member being threaded for cooperating with said threaded aperture, said member having a slot formed in one end thereof, said slot being aligned with the slot in one of said supports, a first keeper having a hooked portion at one end thereof and an aperture formed in the other end thereof, a second keeper having a hooked portion at one end thereof and an aperture formed in the other end thereof, said hooked portion of said first keeper passing through the aligned slots of said member and said one support, said hooked portion of said second keeper passing through the slot of the other support, the apertures of said keepers being alignable to receive a locking member.

3. A device for locking meters of the type having a base and a flanged housing positioned over said base, comprising: a split ring for engaging both the meter base and the flange of the housing and preventing relative motion between them, a pair of supports, each of said supports having a base and a pair of upstanding side members, a first slot formed in said base and continuing upwardly in both of said side members and a second slot formed in one of said side members generally perpendicular to said first slot, and a plate positioned in said first slot, said plate having an aperture therein, the aperture in at least one of said plates being threaded, means for fixedly mounting the base of each of said supports to the outer periphery of said ring adjacent the ends thereof with the second slot of each support being remote from its respective end and the apertures in said plates being aligned, a bolt passing through the aperture in said plates, at least a portion of said bolt being threaded for cooperating with said threaded aperture, said bolt having a portion extending beyond said threaded portion, said extending portion having a slot therein alignable with the second slot of the support with which its threaded portion cooperates, a first keeper having a hooked portion at one end thereof and an aperture formed in the other end thereof, a second keeper having a hooked portion at one end thereof and an aperture formed in the other end thereof, said hooked portion of said first keeper passing through said slot in said bolt and said second slot in the cooperating support, the hooked portion of said second keeper passing through the second slot of the other support, the apertures of said keepers being alignable to receive a locking member to prevent removal of said hooked portions of said keepers from said slots.

4. The device of claim 3 wherein each of said supports is provided with a third slot formed in the other of said side members and aligned with said second slot.

References Cited by the Examiner

UNITED STATES PATENTS

| | | | |
|---|---|---|---|
| 2,526,238 | 10/1950 | Kendall | 292—256.67 X |
| 3,022,103 | 2/1962 | Klygis | 292—256.67 |

FOREIGN PATENTS

| | | |
|---|---|---|
| 35,123 | 8/1929 | France. |

PATRICK A. CLIFFORD, *Primary Examiner.*

R. E. MOORE, *Assistant Examiner.*